United States Patent

[11] 3,568,070

[72] Inventors Gerhard Kaps;
Heinz-Peter Kunert, Hamburg, Germany

[21] Appl. No. 719,035
[22] Filed Apr. 5, 1968
[45] Patented Mar. 2, 1971
[73] Assignee U.S. Philips Corporation
New York, N.Y.
[32] Priority June 23, 1967
[33] Germany
[31] P42436

[54] DECADE-TYPE FREQUENCY DIVIDER
3 Claims, 3 Drawing Figs.

[52] U.S. Cl. .......... 328/42, 328/45
[51] Int. Cl. .......... H03k 21/16
[50] Field of Search .......... 328/45, 39, 42; 307/226; 235/174, 176

[56] References Cited

UNITED STATES PATENTS

| | | | |
|---|---|---|---|
| 3,351,778 | 11/1967 | Seelbach et al. | 307/226X |
| 3,378,697 | 4/1968 | Preston et al. | 307/226X |
| 3,384,827 | 5/1968 | Noordanus et al. | 328/42 |
| 3,401,343 | 9/1968 | O'Lear | 328/45X |

*Primary Examiner*—Stanley T. Krawczewicz
*Attorney*—Frank R. Trifari

ABSTRACT: A frequency divider operating in cascaded decades with selection switches adjustable for selecting from each decade the desired control signal and a gating network for combining the outputs of the respective decade switches for producing a time uniform divided pulse sequence.

PATENTED MAR 2 1971 3,568,070

SHEET 1 OF 2

Figure 1:
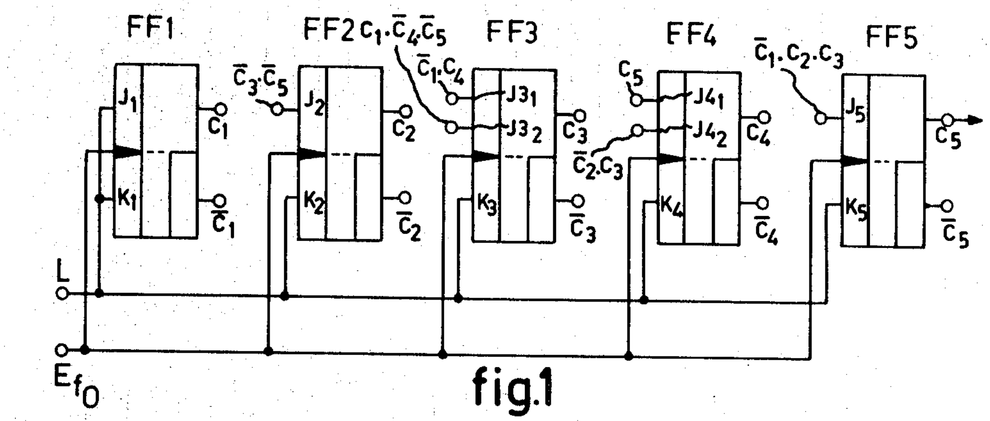

INVENTORS
GERHARD KAPS
HEINZ-PETER KUNERT
BY
Frank R. Trifari
AGENT

INVENTORS
GERHARD KAPS
HEINZ-PETER KUNERT
BY
Frank R. Trifari
AGENT

DECADE-TYPE FREQUENCY DIVIDER

This invention relates to a decade-type frequency divider for producing sequences of pulses in a number finely adjustable in decades ($n$) of pulses distributed as uniformly as possible in time from a sequence of input pulses of $10^m$ pulses. The number $n$ is adjustable to any integer lower than $10^m$, in which the exponent $m$ is to be an integer.

Arrangements for obtaining such pulse sequences ($n$ from $10^m$) are known. Such frequency dividers are employed, for example, by introducing a predetermined desired frequency in frequency ratio controls. In the known arrangements these devices consist of consecutive counting decades, to which decoding devices and/or logical control-circuits or selection gates are connected for obtaining control-signals for gate circuits actuated by the input pulses of the decades. For the selection and the adjustment of a control-signal corresponding to a desired pulse sequence at the output of the gate circuit of a decade digital switches having one or more switching levels or contact box control-members are employed. The addition of the pulse sequences of various decades may be performed by simple OR-links, if it is ensured by a predetermined selection of $n$ from 10 that no coincidence occurs between the individual pulse sequences. In the event of coincidence of two pulses one pulse has to be inserted and to be shifted into a void of the pulse sequence of the higher sequential frequency.

These known frequency dividers have the disadvantage that they require a high amount of switching means in addition to the counting decades for obtaining the control-signals.

It is an object of the invention to provide a counting decade without additional decoding devices or logical control-circuits or selection gates at the outputs of the triggers used for the counting decade, which provides the control-signals required for the selection of the pulse sequences ($n$ from 10), while the pulses of a sequence are equidistant in time to the optimum. The invention provides, in addition, possibilities of cascading the pulse sequences or control-signal sequences of a plurality of decades, while the additional means per counting decade of the frequency divider are at a minimum.

According to the invention this is achieved by combining five bistable triggers for each decade of the frequency divider so that at their outputs the control-signals required for the selection of $n$ from 10 input pulses applied to the decade are formed, when these input pulses are counted, whilst means are provided to select the control-signals for the associated pulse sequences with an adjustable number $n$ of 10 input pulses and for linking together the pulse sequences and/or control-signals supplied by a plurality of cascaded decades.

Figure 2:
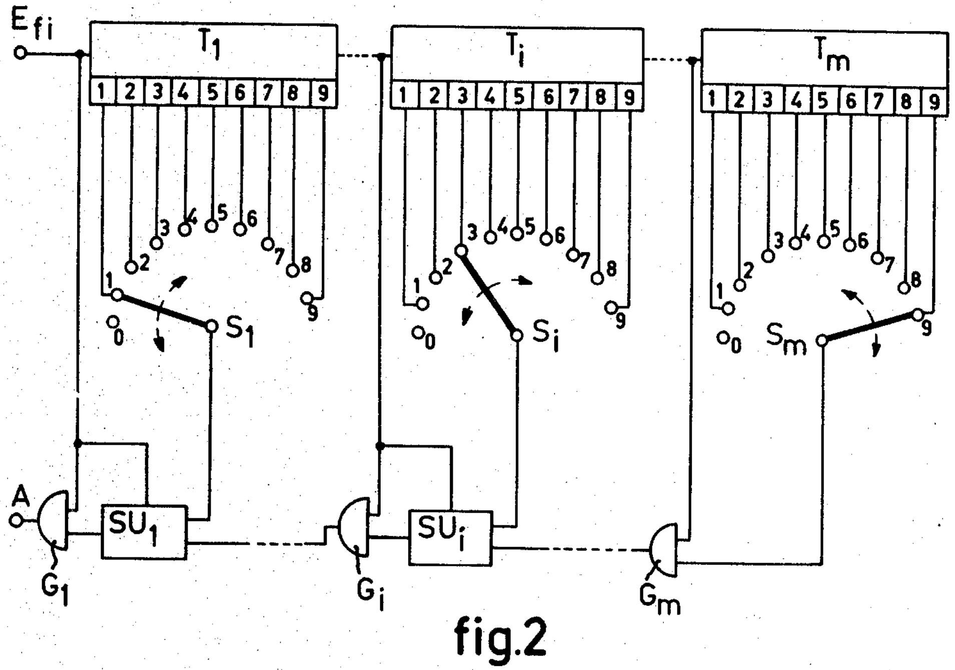
Figure 3:
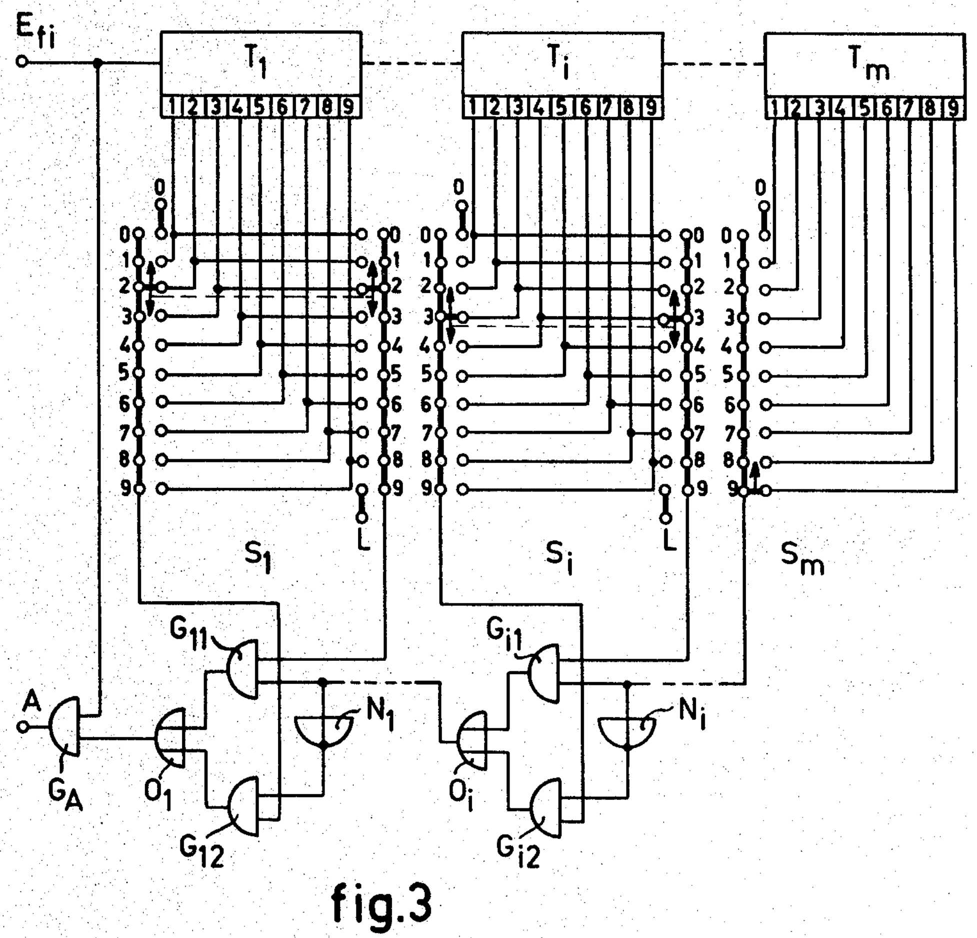

The invention will be described more fully with reference to the drawing, in which;

FIG. 1 shows one embodiment of an $n$-out-of-10 -coded counting decade according to the invention, FIG. 2 shows one embodiment of a frequency divider finely adjustable in decades, FIG. 3 shows one embodiment of a frequency divider in which the output pulses are distributed as uniformly as possible in time.

Table 1 shows a possible predetermined selection for pulse sequences with $n$ from 10 pulses of an input pulse sequence. This predetermined selection provides $n$ pulses from 10 input pulses distributed uniformly to the optimum in time. It provides furthermore the possibility of obtaining the control-signals for a gate circuit at the trigger outputs of a counting decade of five bistable triggers in order to select $n$ input pulses from 10. This is achieved by such a predetermined pulse selection that the control-signals are obtained for pulse sequences having $n$ pulses, exceeding 5, by the negation of the control-signals for the pulse sequences having a corresponding number of pulses complementary to 10:

TABLE 1

| Partial pulse sequences | Pulses of the input sequence | | | | | | | | | |
|---|---|---|---|---|---|---|---|---|---|---|
| n out of 10 | 0 | 1 | 2 | 3 | 4 | 5 | 6 | 7 | 8 | 9 |
| 1 | | | | | | | | x | | |
| 2 | | | | x | | | | | x | |
| 3 | | | x | | | | x | | | x |
| 4 | | x | | | x | | x | | | x |
| 5 | | x | | x | | x | | x | | x |
| 6 | x | | x | x | | x | | x | x | |
| 7 | x | x | | x | x | x | | x | x | |
| 8 | x | x | x | | x | x | x | x | | x |
| 9 | x | x | x | x | x | x | x | | x | x |

Table 2 indicates an $n$-out-of-10 code associated with this predetermined selection for such a counting decade. The outputs $C_5$ to $C_1$ of the bistable triggers of the counting decade provide the control-signals for selecting 1 from 10 to 5 from 10 pulses of the input sequence and the negation outputs $\overline{C}_2$ to $\overline{C}_5$ of the triggers provide the control-signals for the remaining $n$-out-of-10 pulses of the input pulse sequences:

TABLE 2

| | Triggeroutputs | | | | |
|---|---|---|---|---|---|
| | $C_1$ | $C_2$ | $C_3$ | $C_4$ | $C_5$ |
| Pulses of the input sequence: | | | | | |
| 0 | O | O | O | O | O |
| 1 | L | L | O | O | O |
| 2 | O | O | L | O | O |
| 3 | L | O | O | L | O |
| 4 | O | L | O | O | O |
| 5 | L | O | O | O | O |
| 6 | O | L | L | O | O |
| 7 | L | O | O | O | L |
| 8 | O | O | O | L | O |
| 9 | L | L | L | O | O |

A practical embodiment of a counting decade according to the invention operating on the code illustrated in Table 2 is shown in FIG. 1. The five bistable triggers FF 1 to FF 5 are formed by known J–K flip-flops. The pulse sequence of a frequency $f_o$, from which the control-signals for the selection of $n$ from 10 pulses have to be derived, is applied through the input $E_{fo}$ simultaneously to all inputs of the triggers. The triggers preset via their J–K inputs change over synchronously. In the rest position the triggers are assumed to be marked as indicated. The K-inputs of the five triggers receive invariably L-potential in order to insure that the triggers remain out of the rest position only for the time interval between two pulses of the input pulse sequence. In the rest position the changeover of the trigger FF 1 is prepared via the setting input $J_1$ and that of the trigger FF 2 is prepared via the setting input $J_2$ by the first pulse applied to the input $E_{fo}$. The first bistable trigger FF 1 changes its state at each input pulse, since its setting inputs $J_1$, and $K_1$ are invariably at L-potential independently of the state of the further triggers. The second trigger FF 2 is always switched out of the rest position, when the third and the fifth triggers were previously in the rest position. The changeover of the third trigger FF 3 from the rest position is prepared via the input $J_{31}$, when the first trigger FF 1 and the fourth trigger are not simultaneously in the rest position and furthermore, via the input $J_{32}$ when the fourth and the fifth triggers and the first trigger are not simultaneously in the rest position. The fourth trigger FF 4 is prepared via the input $J_{41}$ when the fifth trigger is out of the rest position or when for the input $J_{42}$ the second trigger and the third trigger are not at a same moment in the output state. The fifth trigger is changed over only by the seventh of 10 input pulses, since before the first trigger and not the second and not the third triggers are in the starting position, so that the input $J_5$ is at L-potential. The pulse sequence having $n$ out of 10 pulses of the frequency $fo$ are obtained by the addition of the control-signals appearing at the trigger outputs and of the pulses of the frequency $f_0$, (see FIG. 2 AND gate $G_1$ to $G_m$). This AND operation is required because the control-signals at the outputs $\overline{C}_2$—$\overline{C}$ partly have a pulse duration (L-signal) in view of time including a plurality of input pulses so that for obtaining the decided number of the input pulses a combination of the control-signals with the input pulses is required.

The carry signals for a next divider decade to be initiated by the tenth part of the input frequency may be derived from the output $C_5$ of the fifth trigger of the preceeding divider decade.

In order to construct a frequency divider finely adjustable in decade $m$ counting decades according to FIG. 1 are connected in order of succession in the embodiment of FIG. 2, in which each further divider decade is initiated by the carry signal of the preceding decade. By decade switches ($S_1$ ... $S_i$ ... $S_m$) the desired control-signals of the individual decades are selected. At the last decade $T_m$ the control-signals are directly brought to the duration of the control-signals of the preceding divider decade $T_{m-1}$ by AND-combination with the input signals of the decade in the gate $G_m$. In the other decades $T_i$ the control-signals selected via the switches $S_i$ have added to them the reverse carry pulses of the next-following decade $T_i+_1$ in a summation stage $SU_i$ and only the output signals thereof are combined in an AND-gate $G_i$ with the input signals of the decade $T_i$. If a control-signal of a decade appears simultaneously with a reverse carry pulse of the next-following decade, the reverse carry pulse is inserted in known manner in the summation stage and shifted into a void of the control-signals. At the output of the AND-gate associated with the first divider decade appears a pulse sequence comprising out of the $10^m$ pulses of the input frequency $f_i$ of the frequency divider: $s_i \cdot 10^{m-1} + s_2 \cdot 10^{m-2} + \ldots + s_m$ pulses, wherein $s_i$ designates the positions of the switches $S_i$.

By inserting the reverse carry pulses of a decade into the voids of the control-signals of the preceding divider decade a nonuniformity of the pulse distribution in time in the output pulse sequence is produced. This lack of uniformity has also to be accepted in the known frequency dividers in which it is ensured that by the predetermined selection of the control-signals in consecutive divider decades selected pulses cannot coincide. Such a frequency divider is described, for example, in German Patent Application 1,171,954 laid out for public inspection.

FIG. 3 shows a frequency divider finely adjustable in decades and composed of a cascade of divider decades according to the invention, in which said nonuniformity of the pulse distribution in time is reduced. This is achieved by providing in all divider decades $T_i$, with the exception of the last decade $T_m$, switches $S_i$ with two switching levels and be by performing a selection between the control-signal sequences of the two switching outputs by the reverse carry pulse of the decade $T_i+_1$ following the divider decade $T_i$. The switching levels, offset by one, are connnected so that at the switching outputs the control-signals for the pulse sequence associated with the adjusted number $s_i$ and the control-signals for the pulse sequence associated with the number $S_i+_1$ are available.

The selection between the control-signals of the two switching outputs of a decade is performed via two AND-gates $G_{i1}$, $G_{i2}$, which are excited by the reverse carry pulses of the next-following divider decade directly ($G_{i1}$) and by the pulses inverted by an inverter stage $N_i$ ($G_{i2}$), and the outputs of which are connected to the inputs of an OR-gate $O_i$. At the output of the OR-gate $O_i$ and directly at the switching output of the last divider decade $T_m$ appear the carry control-signals of a divider decade. In order to form the pulse sequence having $n$ from $10^m$ pulses of the pulse sequence applied to the input $E_{fi}$ the carry control-signals of the first divider decade are combined in an AND-gate $G_A$ with the pulses of the input pulse sequence. From the switching positions $n$ is found to be:

$$n = s_1 \cdot 10^{m-1} + \ldots . s_i \cdot 10^{m-i} + + s_m.$$

The operation of the arrangement shown in FIG. 3 will be illustrated with reference to a simple numerical example. The frequency divider is assumed to comprise three decades. From 1,000 pulses applied to the input $E_{fi}$ 239 pulses will have to be selected with optimum uniform distribution in time. From 10 input pulses of the third decade is selected a control-signal for nine pulses, from 10 input pulses of the second decade are selected the control-signals for three and four pulses under the control of the third decade once for three and nine times for four pulses of 10 input pulses of the second decade, so that from 100 input pulses of the second decade a control-signal is available for 1.3 + 9.4 = 39 pulses. This control-signal changes over in the first decade between the control-signals for two of 10 and three of 10 input pulses of the first decade so that from 1,000 input signals a control-signal is derived for 39.3 + 61.2 = 239 pulses.

We claim:

1. A frequency divider operating in cascaded decades for producing pulse sequences in a number finely adjustable in decades and substantially uniformly time distributed from an input pulse sequence of $10^m$ pulses, each of said divider decades comprising five bistable triggers, each having one or more first input means, second input means and a clock pulse input means, means coupling said input pulse sequence to said clock pulse input means, means coupling a constant potential signal to said second input means, means coupling a control signal to said one or more first input means, said control signal derived from combinations of respective bistable trigger output signals, and said bistable trigger responsive to said input pulses and said control signals for providing a number of $n$ from 10 input pulses at the respective outputs of said bistable triggers, adjustable means coupled to each of said decades in said divider for adjustable selecting a desired control signal, and combining means coupled to each of said adjustable means for combining signals supplied by said cascaded decades for producing the divided pulse sequence.

2. The combination of claim 1 wherein said adjustable means includes a decade switch coupled to each of said decades, and said combining means includes a first AND gate coupled to the last decade responsive to a coincidence of the input pulses to said decade and the output of said decade switch, a plurality of summation stages each respectively responsive to the output of the prior decade stage AND gate output, the input pulses of the associated decade and the output of the associated decade switch for providing an output signal combined in a second AND gate in coincidence with the input pulses of the associated decade, each second AND gate output coupled as an input to the next successively higher decade summation stage, the output of the final decade AND gate producing the divided, pulse sequence.

3. The combination of claim 1 wherein said adjustable means includes, for the last divider decade, a decade switch having a first output control signal, and in further divider decades, by decade switches having two switching levels relatively offset and responsive to the respective counting decade outputs for providing a first output control signal corresponding to an adjusted number and a second output control signal corresponding to the adjusted number plus one, each of said decades including a first AND gate having an output responsive to a coincidence of inputs derived from said second output control signal and an output from the prior stage, and a second AND gate having an output responsive to a coincidence of inputs derived from said first output control signal and the inversion of said prior stage output, said prior stage output formed by OR gate combination of said first and second AND gate outputs, and for said last stage output by the output of said decade switch.